United States Patent [19]
Maison

[11] 3,730,311
[45] May 1, 1973

[54] COLLECTOR SLED AND MOUNTING STRUCTURE THEREFOR FOR HIGH SPEED, TRACK MOUNTED ELECTRIC VEHICLE

[75] Inventor: Richard L. Maison, San Diego, Calif.

[73] Assignee: Rohr Industries, Inc., Chula Vista, Calif.

[22] Filed: Mar. 10, 1971

[21] Appl. No.: 122,729

[52] U.S. Cl. ................................. 191/49, 191/59.1
[51] Int. Cl. .......................................... B60l 5/38
[58] Field of Search .......................... 191/4, 45–51, 191/59, 59.1, 60, 60.1, 61.2, 61.3, 65–70, 85

[56] References Cited

UNITED STATES PATENTS

| | | | |
|---|---|---|---|
| 3,169,733 | 2/1965 | Barrett | 191/66 |
| 3,444,338 | 5/1969 | Leger | 191/66 |
| 3,303,294 | 2/1967 | Howell | 191/60.1 |
| 1,115,789 | 11/1914 | Deasy | 191/91 |
| 766,625 | 8/1904 | Jenkins | 191/49 |
| 1,359,503 | 11/1920 | Hamilton | 191/65 |
| 2,696,533 | 12/1954 | Hammerly | 191/48 |
| 374,236 | 12/1887 | Bentley | 191/49 |

*Primary Examiner*—Gerald M. Forlenza
*Assistant Examiner*—D. W. Keen
*Attorney*—George E. Pearson

[57] ABSTRACT

A collector sled for a high speed, track mounted, electrically propelled vehicle is of a size to fit slidably within the space defined by three electrically charged rails mounted alongside a track for such vehicle. The sled is provided with three sets of collector brushes which are spring biased into wiping electrical contact, one set with each of the rails.

The sled is towed on the outer end of an articulated, spring balanced, two part support, extensibly mounted in a sled-receiving recess provided in a side of a vehicle. The sled is stowable in the recess, and in stowed position a portion of the sled support structure closes off the recess. A closure panel is hingedly mounted on an edge of the recess and swings out to close the recess when the sled is deployed. This closure panel also swings inwardly to admit the sled and its support for stowing.

10 Claims, 4 Drawing Figures

Patented May 1, 1973

INVENTOR.
RICHARD LE ROY MAISON

BY

*George E. Nelson*

ATTORNEY

Patented May 1, 1973

INVENTOR.
RICHARD LE ROY MAISON
BY
George E. Pearson
ATTORNEY

COLLECTOR SLED AND MOUNTING STRUCTURE THEREFOR FOR HIGH SPEED, TRACK MOUNTED ELECTRIC VEHICLE

BACKGROUND OF THE INVENTION

Many types of brushes and trolleys have been devised to conduct electricity from one or more electrically energized wires or rails, located either above, beside or below an electric train track, into an electrically propelled vehicle mounted on the track. For the purposes of the present description, the term "alongside" and words of like import are intended to mean any of the foregoing locations. One such prior arrangement, disclosed in U.S. Pat. No. 2,626,301 and 2,696,533, comprises a collector sled with three collector brushes slidably mounted within the space defined by three, triangularly arranged, electrically charged rails, with the brushes in wiping electrical contact with the rails. Such prior sleds are supported from the vehicles upon which they are mounted, but without freedom for substantial adjustment, and with the sled in laterally offset relation to its longitudinal center of mass. These prior mounting arrangements may tend to induce pitching or yawing of the sled, and may result in a tendency for the sled to bind in the rails, to create excess friction, and to shorten brush life.

SUMMARY OF THE INVENTION

The present invention provides a mounting structure for a collector sled riding within the space defined by three collector rails arranged in parallel relation, and in triangular cross sectional configuration, alongside a track for a high speed electric train. The collector sled has three sets of brushes spring biased into centered, wiping, electrical contact with respective collector rails. The sled is connected at its forward end, for universal towing movement, in longitudinal alignment with its center of mass, to the outer end of a two part, counterbalanced, folding support structure. The aft end of the sled is free for limited lateral movement to allow the sled to follow in trace, without lateral restriction, during operation, but is engaged to support the rear end of the sled when the latter is freed from the tracks for stowing. The inner end of the sled support structure is hingedly mounted in a recess in a side of a vehicle and the support and sled are movable between deployed position, wherein the sled is towed along within the space defined by the three rails, and stowed position wherein the support structure and sled are housed in the recess. Upon deployment of the sled, the recess is closed by a hinged panel, and upon stowing, by a panel-like portion of the sled support structure.

A primary objective of the invention is to provide a collector sled for collecting electricity from three electrically charged rails and conducting it into an electrically propelled vehicle mounted on a support track, the sled being towed at its forward end in line with its center of mass. The sled support structure with the sled mounted thereon, is stowed in a recess provided in a side of the vehicle when not in use, the recess being closed for streamlining when the sled is deployed, and also when stowed.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
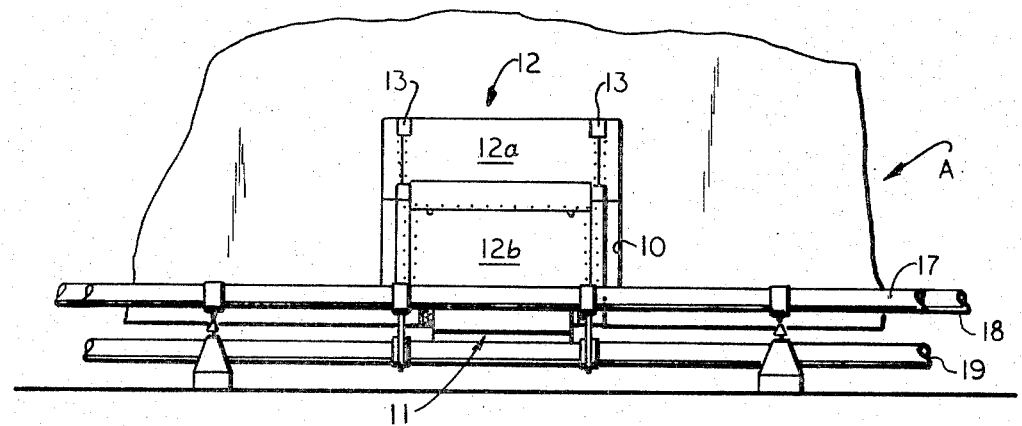
FIG. 1 is a fragmentary, side, elevational view showing a portion of an electric vehicle with a collector sled and support mechanism embodying the invention mounted thereon and in deployed position, fragments of three electrically charged rails being shown.

Referring to the drawings in detail, an illustrative embodiment of the invention is shown incorporated in an air cushion, track mounted vehicle A of a type generally similar to that disclosed in U.S. Pat. No. 3,190,235 to Bertin, but propelled by suitable electrical propulsion means such as a linear induction motor, or L.I.M., not shown. The type of vehicle in which the invention is embodied is not material to the invention, and could be wheel mounted, floated by air or magnetic repulsion, or other means. It should, however, be track mounted or guided, and electrically propelled.

A stowing recess 10 is provided in a side of the vehicle A to house a collector sled 11 and its support mechanism 12, the latter comprising two hingedly connected, preferably streamlined panels 12a and 12b. The inner panel 12a is hingedly mounted on hinge brackets 13 within the upper end of the recess 10, the hinge pintle 14 being a torsion spring rod mounted and secured to the inner panel 12a to counterbalance the weight of the two-part support 12 in its deployed position shown in FIGS. 1 – 3.

Figure 4:
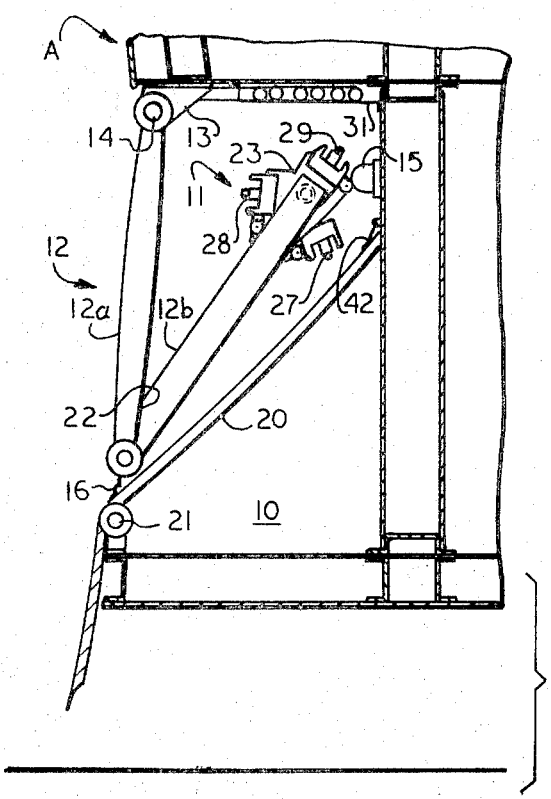
FIG. 4 is a view generally similar to FIG. 3 with the sled and its support structure stowed in the recess.

The support 12, with the sled 11 mounted thereon, folds for stowing into the recess 10 as shown in FIG. 4, in which position the inner support panel 12a closes the entrance to the recess 10 for streamlining the side of the vehicle A. A conventional latch 16 secures the panel 12a in this position, while a resilient bumper pad 15 cushions the sled and prevents rattle.

In its deployed position the sled 11 glides along within the space defined by three, spaced, parallel, electrically energized rails 17, 18 and 19, each of which serves as a bus bar to supply usual three phase or other required electric current for propulsion and other needs of the vehicle A. In the deployed position of the sled a closure panel 20, see FIGS. 2 and 3, hingedly mounted at the lower end of the recess 10, is spring biased outwardly by a torsion spring hinge pintle 21 to the position shown in FIG. 3, thereby closing the opening into the recess 10 for streamlining the side of the vehicle with the sled deployed.

The panels 12a and 12b of the sled support 12 are light-weight, and preferably are constructed in accordance with well known aircraft design principles, for example in the manner of a conventional aircraft elevator or rudder. The outer support panel 12b is shorter from front to rear than the inner panel 12a as is evident in FIGS. 1 and 2, and the inner wall of the inner panel 12a is cut away at 22, see FIG. 4, to allow the outer panel 12b to fold upwardly into stowing position. Since the electric vehicle A is intended for high speed travel, for example in excess of 200 m.p.h., the exposed parts, including the sled support panels 12a and 12b and the sled 11, should be streamlined for the designed speed in accordance with well known aerodynamic principles of design.

Figure 2:
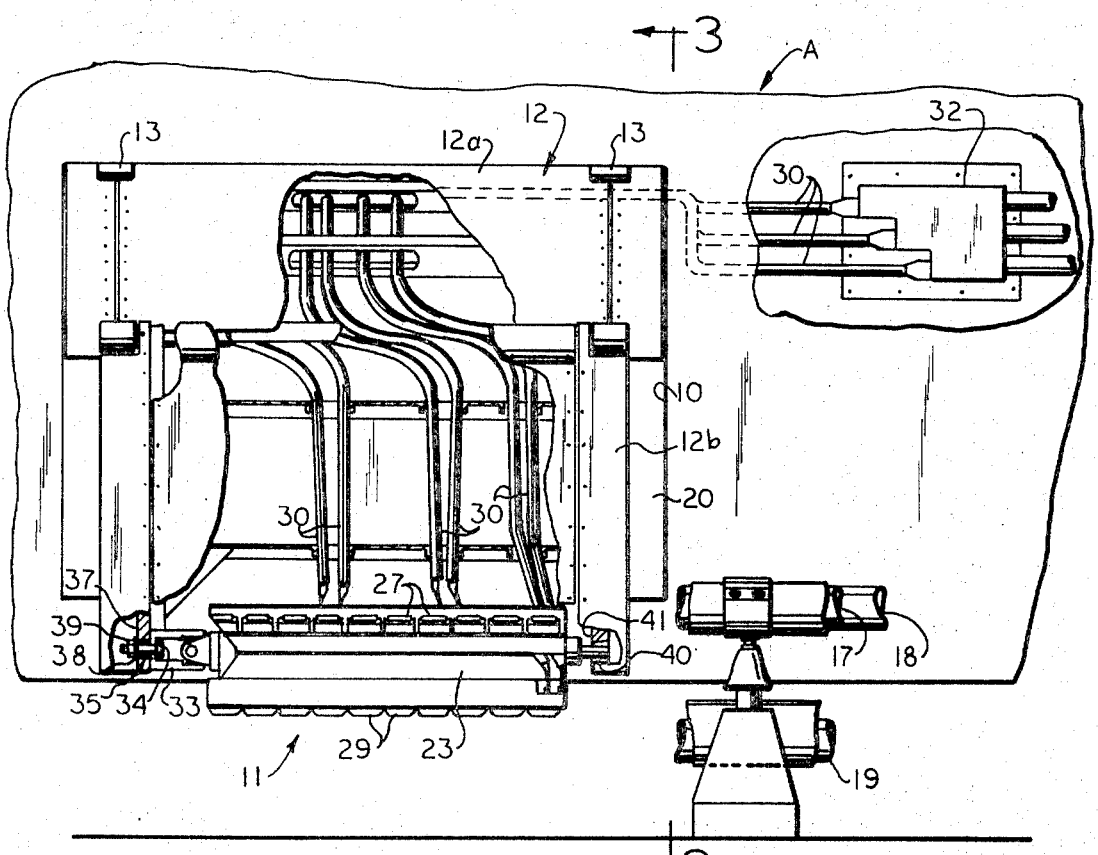
FIG. 2 is an enlarged view, similar to FIG. 1, but with most of the rails, and portions of the sled support members and vehicle wall broken away.

The structural details of the sled 11, except for the manner in which the sled is mounted on the panel 12, are not per se features of the present invention. The illustrative sled 11 comprises an elongated body 23 of strong, preferably electrically insulative material, of generally triangular cross sectional shape. Three conventional, aligned, brush sets 27, 28 and 29 are mounted on the sled body 23, each brush set being spring biased outwardly and electrically connected to one or more insulated cables 30. As illustrated in FIG. 2, each brush set is connected to two of the cables, which are led up within the support panels 12a and 12b as shown in FIG. 2, and in broken lines in FIG. 3, and thence, supported by brackets 31, to a suitable junction point, such as the conventional quick-disconnect box 32 shown in the break-away of FIG. 2. The sled 11 is so constructed and mounted that each of the three sets of brushes is directed toward centered, wiping contact with its respective electrically charged rail when the sled is deployed for use.

For mounting the sled 11 on the free end of the outer support panel 12b, a conventional universal joint 33, see FIG. 2, is mounted on the leading end of the sled 11 with its point of universal movement in longitudinal alignment with the center of mass of the sled 11. The forward end of the universal joint 33 comprises a stud 34, inserted through a bushing 35, which is fitted for free rotative movement in a bearing hole provided in a frame member 37 in the forward end of the outer support panel 12b. The bushing 35 is slightly longer than the thickness of the frame member 37 to prevent binding on the frame member by a thrust bearing washer 38 mounted on the stud and secured by a lock nut 39. Thus the sled is towed by the universal joint 33, the towing force being applied to the sled in longitudinal alignment with the center of mass of the sled, which is also free for rotative adjustment about its longitudinal axis.

A stub support shaft 40, see FIG. 2, projects rearwardly from the sled, preferably also in line with the latter's center of mass, and is inserted with a loose fit in an opening provided in a rear frame member 41 of the outer support panel 12b. Sufficient clearance is provided between the stub shaft and the sides of its opening in the frame member to allow the sled to follow the universal joint 33 in trace without lateral restriction from the stub shaft within normal limits of curvature of the rails 17, 18 and 19. However, when the sled is raised for stowing, the stub shaft is engaged by the rear frame member 41 to support the rear end of the sled, while the universal joint 33 supports the leading end.

OPERATION

Figure 3:
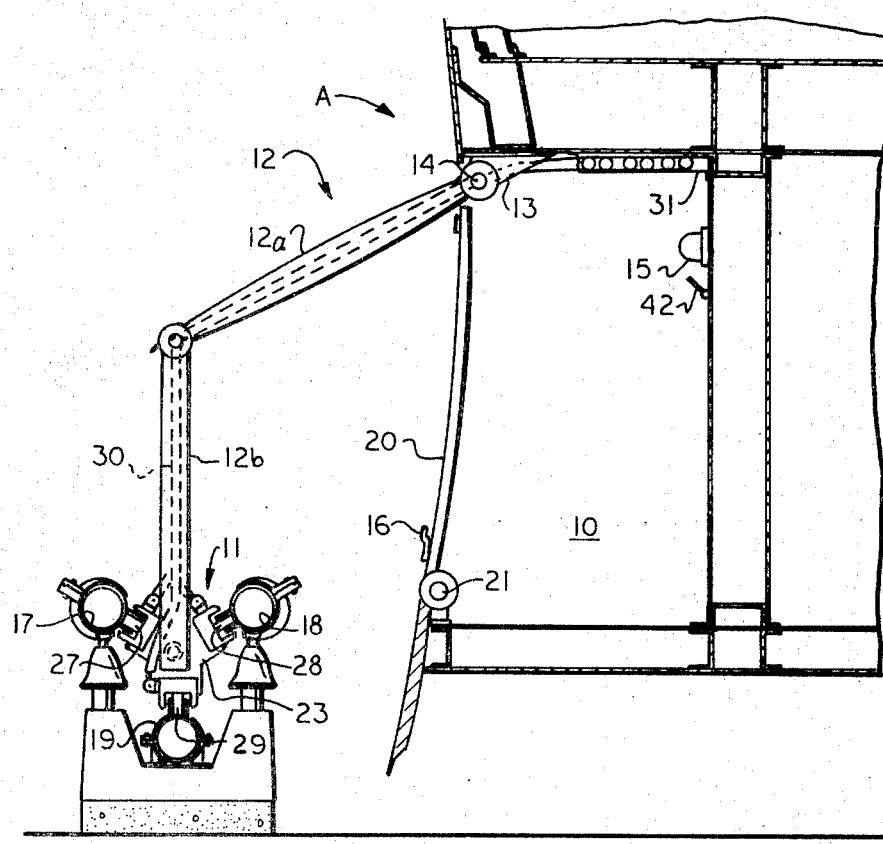
FIG. 3 is a somewhat diagrammatic, sectional view taken along line 3—3 of FIG. 2.

It is assumed that the sled 11 when deployed is caged within the three rails 17, 18 and 19 as shown in FIGS. 1 and 3, and that its three sets of brushes 27, 28 and 29 are biased into wiping engagement with their respective rails in a well known manner. In this deployed position of the sled, the weight of the two part support 12 is balanced by the bias of the torsion pintle 14. Current from the electrically charged rails thus is collected from the rails and conducted through the cables 30 to the electrical drive and other mechanism, not shown, of the vehicle A in a usual manner. With the sled in such deployed position, the hinged closure panel 20 is biased outwardly by its torsion spring pintle 21 to its position shown in FIG. 3 to close the opening into the recess 10.

At selected points along the track, and at division points or terminals where the vehicle A is to be reversed, a gap, not shown, slightly longer than the sled 11 is provided in one or both of the upper charged rails 17 and 18 through which the sled may be lifted out and stowed in the recess 10 as shown in FIG. 4.

If desired, suitable mechanical stowing mechanism, not shown, such as conventional hydraulic or pneumatic cylinders, may be readily devised by any ordinarily competent designer or engineer for this purpose. However, since the support panels 12a and 12b are light, of the order of 6 – 8 pounds each, and the sled weighs only approximately 20 – 30 pounds, it is presently preferable to stow and deploy the sled manually, as this saves weight, avoids complication, and can be done easily and quickly by existing service or operating personnel.

In stowing the sled 11, the closure panel 20 is swung inwardly and preferably secured by conventional latch means 42, see FIGS. 3 and 4. The outer support panel 12b is then folded inwardly and upwardly to its stowed position shown in FIG. 4, and the inner panel 12a is swung down to close the opening into the recess 10. The latch means 16 is then engaged to retain the panels 12a and 12b and the sled 11 in this stowed position, wherein the sled is cushioned by the resilient bumper pad 15.

To completely remove the sled 11 and its support 12 from the vehicle A for service or replacement, the cable junctions in the junction box 32 are disconnected, and the cables are released from their brackets and withdrawn. To remount the sled, this procedure is reversed.

To reverse direction of the vehicle A, as at a terminal, the sled 11 which brought the vehicle to the terminal, is stowed, as shown in FIG. 4, and either an oppositely facing similar sled on the same side of the vehicle is deployed, or the vehicle is reversed end for end on a conventional turntable, and another similar sled, not shown, but similarly mounted in a recess in the other side of the vehicle, is deployed and mounted within the rails 17, 18 and 19 as shown in FIGS. 1, 2 and 3. Such other sled is headed in the new direction of vehicle travel for the return run.

The invention provides a collector sled which, with its support, is streamlined to offer little wind resistance either when deployed or stowed, is towed by a force applied at its leading end in line with its center of mass, is free for easy self adjustment to accommodate for relative changes between the rails and the vehicle, and is supported at both ends by the universal joint 33 and stub shaft 40 except when deployed within the space defined by the rails.

Having thus described my invention, what I claim as new and useful and desire to secure by U.S. Letters Patent is:

1. In combination with a vehicle track, a high speed, electrically propelled vehicle mounted for operation on the track, and a plurality of electrically charged rails mounted alongside the track generally parallel to each other and to the track,
   a collector sled comprising an insulative body portion constructed for guided movement along the charged rails,
   a plurality of contact brushes mounted on the sled body portion, at least one of the brushes being located for electrical contact with each charged rail,
   collector sled support structure mounted on the vehicle and comprising at least two articularly interconnected support members, an inner end of one of said support members hingedly connected to the vehicle,
   a universal towing connection connecting an outer end of the other of said members to a forward end portion of the sled, the support structure being so mounted and of such length as to be movable in articulation between deployed position with the support structure extended and the sled mounted for universal towed movement along the rails, and stowed position with the support structure folded and the sled supported adjacent a side of the vehicle, and
   flexible electrical conductor means electrically connected to each of the brushes and extending along the support structure into the vehicle.

2. The combination defined in claim 1 wherein an outer element of the support structure extends in front of the sled, and the universal towing connection connects said outer element of the support structure to the forward end portion of the sled in line with the longitudinal center of mass of the sled.

3. The combination defined in claim 2 wherein a portion of the support structure spaced rearwardly from the universal towing connection is clear of operative engagement with the sled when the latter is mounted for guided movement along the charged rails to thereby allow the sled to follow the universal towing connection in train, and wherein said rearwardly spaced portion of the support structure operatively engages the sled in supporting relation when the sled is clear of the charged rails when moving the support structure from deployed to stowed position.

4. The combination defined in claim 3 wherein said rearwardly spaced portion of the support structure comprises an annular portion, and the element of the sled engaged thereby is a stub shaft extending longitudinally from the sled into the annular portion.

5. The combination defined in claim 1, and spring means biasing the support structure upwardly to substantially zero weight condition at its universal pivotal connection to the sled with the support structure in deployed position.

6. The combination defined in claim 1 wherein a stowing recess is provided in the vehicle upon which the support structure is mounted, and the inner end of the support structure is hingedly mounted to the vehicle adjacent such recess.

7. The combination defined in claim 6 wherein such stowing recess is of a size and conformation, and the hinge mounting for the support structure is so located, that the support structure and sled are housed flush in such recess with the support structure in stowed position.

8. The combination defined in claim 7 wherein at least one of two articulated parts of the support structure comprises a panel, and said panel closes off the recess flush with a side of the vehicle with the support structure in stowed position.

9. The combination defined in claim 8, and a closure panel hingedly mounted along an edge of the recess, said closure panel being of a size and shape, and so located, as to be swingable to a position to close off the recess flush with a side of the vehicle with the support structure in deployed position.

10. The combination defined in claim 9, and means biasing the hingedly mounted panel toward its flush mounted position to close off the recess, said closure panel being swingable against the bias of said biasing means to a position to admit the support structure and sled into such recess upon moving the support structure from deployed to stowed position.

* * * * *